United States Patent
Kawamoto

(10) Patent No.: US 11,256,857 B2
(45) Date of Patent: Feb. 22, 2022

(54) APPARATUS AND NON-TRANSITORY COMPUTER READABLE MEDIUM FOR PROPOSAL CREATION CORRESPONDING TO A TARGET PERSON

(71) Applicant: FUJIFILM Business Innovation Corp., Tokyo (JP)

(72) Inventor: Shinji Kawamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/944,164

(22) Filed: Jul. 31, 2020

(65) Prior Publication Data

US 2021/0271806 A1    Sep. 2, 2021

(30) Foreign Application Priority Data

Feb. 27, 2020    (JP) .............................. JP2020-032169

(51) Int. Cl.
G06F 40/166    (2020.01)

(52) U.S. Cl.
CPC .................................. G06F 40/166 (2020.01)

(58) Field of Classification Search
None
See application file for complete search history.

(56) References Cited

U.S. PATENT DOCUMENTS

| | | | |
|---|---|---|---|
| 9,679,018 B1* | 6/2017 | Yuksel | G06F 16/335 |
| 9,754,210 B2* | 9/2017 | Xia | G06Q 30/02 |
| 2003/0046182 A1* | 3/2003 | Hartman | G06Q 30/06 705/26.1 |
| 2005/0138049 A1* | 6/2005 | Linden | G06F 16/9535 |
| 2006/0206480 A1* | 9/2006 | Heidloff | G06F 16/9535 |
| 2007/0179946 A1* | 8/2007 | Wissner-Gross | G06F 16/958 |
| 2012/0047150 A1* | 2/2012 | Spiegel | G06F 16/285 707/748 |
| 2012/0290599 A1* | 11/2012 | Tian | G06Q 30/02 707/758 |
| 2013/0246452 A1* | 9/2013 | Vadrevu | G06F 16/9537 707/769 |
| 2013/0346385 A1* | 12/2013 | Kraftsow | G06F 16/9535 707/708 |
| 2015/0020086 A1* | 1/2015 | Chen | H04N 21/44008 725/12 |
| 2015/0130703 A1* | 5/2015 | Ghajar | G06F 3/013 345/156 |
| 2015/0178741 A1 | 6/2015 | Ono et al. | |
| 2015/0186491 A1* | 7/2015 | Zukerman | G06F 16/337 707/740 |
| 2015/0281783 A1* | 10/2015 | Laksono | H04N 21/4415 725/10 |

(Continued)

FOREIGN PATENT DOCUMENTS

| | | |
|---|---|---|
| JP | 2006323555 | 11/2006 |
| JP | 2015135663 | 7/2015 |

(Continued)

*Primary Examiner* — Asher D Kells
(74) *Attorney, Agent, or Firm* — JCIPRNET

(57) ABSTRACT

A document creation apparatus includes a processor configured to: acquire information about a person; estimate a topic of interest to the person, based on the acquired information; acquire one or more articles related to the estimated topic; and create a document by using the acquired one or more articles.

11 Claims, 14 Drawing Sheets

| ARTICLE TYPE | AREA RATIO | | | LAYOUT | | | CHARACTER MODIFICATION | | |
|---|---|---|---|---|---|---|---|---|---|
| | 1 | 2 | 3 | 1 | 2 | 3 | 1 | 2 | 3 |
| CUSTOMER PROBLEM | 6 | 4 | – | UPPER | LOWER | – | ... | ... | – |
| CASE INFORMATION | 5 | 3 | 2 | RIGHT | UPPER LEFT | LOWER RIGHT | ... | ... | ... |
| ... | ... | ... | ... | ... | ... | ... | ... | ... | ... |

124

(56) References Cited

U.S. PATENT DOCUMENTS

2017/0134803 A1* 5/2017 Shaw ............... H04N 21/42203
2017/0228463 A1* 8/2017 Sharma ............... G06F 16/2477
2018/0225378 A1* 8/2018 Bhadury ................. G06F 7/026

FOREIGN PATENT DOCUMENTS

WO    WO-2014108195 A1 * 7/2014 ....... H04N 21/44218
WO    WO-2015192025 A1 * 12/2015 ............. H04L 67/02

* cited by examiner

FIG. 5

| PRODUCT ID | PRODUCT TYPE |
|---|---|
| P81 | MULTIFUNCTION PERIPHERAL |
| P82 | SERVER APPARATUS |
| P83 | NETWORK DEVICE |
| P84 | CLOUD SERVICE |
| ... | ... |

P81

| CONTRACT ID | PROPOSED PERSON ID | INTEREST INFORMATION | | | | |
|---|---|---|---|---|---|---|
| | | WORK EFFICIENCY IMPROVEMENT | COST REDUCTION | SECURITY | INFORMATION MANAGEMENT | ENHANCEMENT |
| C01 | U11 | - | O | - | - | - |
| C02 | U12 | - | O | - | - | - |
| C03 | U13 | - | - | O | - | - |
| C04 | U14 | - | O | - | - | O |
| ... | ... | ... | ... | ... | ... | ... |

FIG. 6

| ARTICLE ID | ARTICLE TYPE | ARTICLE CLASSIFICATION | PRODUCT ID | TOPIC TYPE | ARTICLE DATA |
|---|---|---|---|---|---|
| D01 | COVER PAGE | COMMON | - | - | ... |
| D02 | COVER PAGE | COMMON | - | - | ... |
| ... | ... | ... | ... | ... | ... |
| D11 | TABLE OF CONTENTS | COMMON | - | - | ... |
| ... | ... | ... | ... | ... | ... |
| D21 | INDUSTRY TREND | COMMON | - | - | ... |
| D22 | INDUSTRY TREND | COMMON | - | - | ... |
| D23 | INDUSTRY TREND | COMMON | - | - | ... |
| ... | ... | ... | ... | ... | ... |
| D31 | CUSTOMER PROBLEM | PRODUCT UNIQUE | P81 | WORK EFFICIENCY IMPROVEMENT | ... |
| D32 | CUSTOMER PROBLEM | PRODUCT UNIQUE | P81 | COST REDUCTION | ... |
| D33 | CUSTOMER PROBLEM | PRODUCT UNIQUE | P81 | SECURITY | ... |
| ... | ... | ... | ... | ... | ... |
| D41 | PRODUCT INFORMATION | PRODUCT UNIQUE | P81 | - | ... |
| D42 | PRODUCT INFORMATION | PRODUCT UNIQUE | P82 | - | ... |
| D43 | PRODUCT INFORMATION | PRODUCT UNIQUE | P83 | - | ... |
| ... | ... | ... | ... | ... | ... |
| D51 | CASE INFORMATION | PRODUCT UNIQUE | P81 | WORK EFFICIENCY IMPROVEMENT | ... |
| D52 | CASE INFORMATION | PRODUCT UNIQUE | P81 | COST REDUCTION | ... |
| D53 | CASE INFORMATION | PRODUCT UNIQUE | P81 | SECURITY | ... |
| ... | ... | ... | ... | ... | ... |

FIG. 10

■ INPUT OF PROPOSED PERSON INFORMATION　　[ RETURN ]　[ NEXT ]
　　　　　　　　　　　　　　　　　　　　　　　　　B1　　　　B2

PLEASE INPUT INFORMATION ON TARGET PERSON TO WHOM PROPOSAL WILL BE EXPLAINED.

| | | |
|---|---|---|
| PROPOSAL DESTINATION CUSTOMER NAME: | B CORPORATION | F1 |
| PROPOSED PERSON NAME: | ICHIRO YAMADA | F2 |
| BELONGING DEPARTMENT: | GENERAL AFFAIRS DEPARTMENT | F3 |
| ROLE/POSITION: | MANAGER (GENERAL MANAGER) | F4 |

FIG. 11

| | | INTEREST INFORMATION | | | | |
|---|---|---|---|---|---|---|
| VISIT DATE AND TIME | PROPOSED PERSON ID | WORK EFFICIENCY IMPROVEMENT | COST REDUCTION | SECURITY | INFORMATION MANAGEMENT | ENHANCEMENT |
| ... | U11 | 4 | 5 | 3 | 2 | 1 |
| ... | U12 | 4 | 5 | 3 | 1 | 2 |
| ... | U13 | 2 | 3 | 5 | 4 | 1 |
| ... | U14 | 3 | 5 | 2 | 1 | 4 |
| ... | ... | ... | ... | ... | ... | ... |

PRODUCT TABLE — 1221

| ARTICLE TYPE | AREA RATIO | | | LAYOUT | | | CHARACTER MODIFICATION | | |
|---|---|---|---|---|---|---|---|---|---|
| | 1 | 2 | 3 | 1 | 2 | 3 | 1 | 2 | 3 |
| CUSTOMER PROBLEM | 6 | 4 | - | UPPER | LOWER | - | ... | ... | - |
| CASE INFORMATION | 5 | 3 | 2 | RIGHT | UPPER LEFT | LOWER RIGHT | ... | ... | ... |
| ... | ... | ... | ... | ... | ... | ... | ... | ... | ... |

FIG. 13B

| ARTICLE TYPE | AREA RATIO |
|---|---|
| CUSTOMER PROBLEM | PROPORTIONAL TO POINTS OF INTEREST |
| CASE INFORMATION | PROPORTIONAL TO SQUARE OF POINTS OF INTEREST |
| ... | ... |

APPARATUS AND NON-TRANSITORY COMPUTER READABLE MEDIUM FOR PROPOSAL CREATION CORRESPONDING TO A TARGET PERSON

CROSS-REFERENCE TO RELATED APPLICATIONS

This application is based on and claims priority under 35 USC 119 from Japanese Patent Application No. 2020-032169 filed Feb. 27, 2020.

BACKGROUND

(i) Technical Field

The present invention relates to a document creation apparatus and a non-transitory computer readable medium storing a program.

(ii) Related Art

As a technique for creating a document such as a proposal, based on the company information of the proposal destination, for example, there are JP2006-323555A and JP2015-135663A. This company information is often the business type and scale of the company, but may not be effective in a case where the content of the proposal does not correspond to the interest of the person in charge at the company to which the proposal is submitted.

SUMMARY

Aspects of non-limiting embodiments of the present disclosure relate to a document creation apparatus and a non-transitory computer readable medium storing a program, that create a document such as a proposal, according to the interests of a target person such as a person in charge in a sales destination or the like, for example.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document creation apparatus including a processor configured to: acquire information about a person; estimate a topic of interest to the person, based on the acquired information; acquire one or more articles related to the estimated topic; and create a document by using the acquired one or more articles.

BRIEF DESCRIPTION OF THE DRAWINGS

Exemplary embodiment(s) of the present invention will be described in detail based on the following figures, wherein:

FIG. 5 is a diagram illustrating an example of a sales DB 122;

FIG. 6 is a diagram illustrating an example of an article DB 123;

FIG. 10 is a diagram illustrating an example of an operation screen for inputting information on a proposed person;

FIG. 11 is a diagram illustrating an example of a sales DB 122a in a modification example;

FIGS. 13A and 13B are diagrams illustrating an example of a display mode DB 124;

DETAILED DESCRIPTION

Exemplary Embodiment

Configuration of Information Processing System

Figure 1:
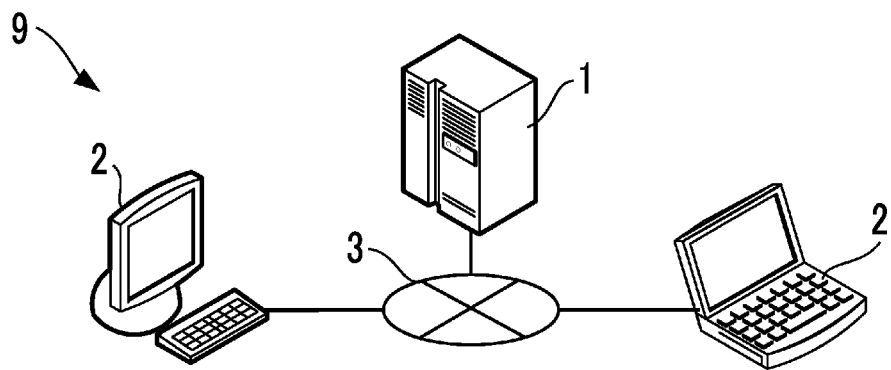
FIG. 1 is a diagram illustrating an example of an overall configuration of a document creation system 9.

FIG. 1 is a diagram illustrating an example of the overall configuration of a document creation system 9. The document creation system 9 is a system for creating a document in accordance with the interests of a target person. The document creation system 9 includes a document creation apparatus 1, a terminal 2, and a communication line 3 as illustrated in FIG. 1.

The terminal 2 is a terminal used by each user of the document creation system 9, and is, for example, a personal computer such as a desktop computer, a notebook computer or a tablet computer. The document creation system. 9 illustrated in FIG. 1 has a plurality of terminals 2.

The document creation apparatus 1 is an information processing apparatus that creates a document in accordance with the interest of the person designated by the terminal 2. The document creation apparatus 1 is, for example, a server apparatus that responds to a request from the terminal 2, which is a computer, and is a client apparatus.

The communication line 3 is a line for communicably connecting the document creation apparatus 1 and the terminal 2. The communication line 3 may be, for example, a Local Area Network (LAN), a Wide Area Network (WAN), the Internet, or a combination thereof. Further, the communication line 3 may include Public Switched Telephone Networks (PSTN), Integrated Services Digital Network (ISDN), or the like.

The number of document creation apparatuses 1, terminals 2, and communication lines 3 in the document creation system 9 may not be limited to the number shown in FIG. 1, and may be one or more.

Configuration of Terminal

Figure 2:
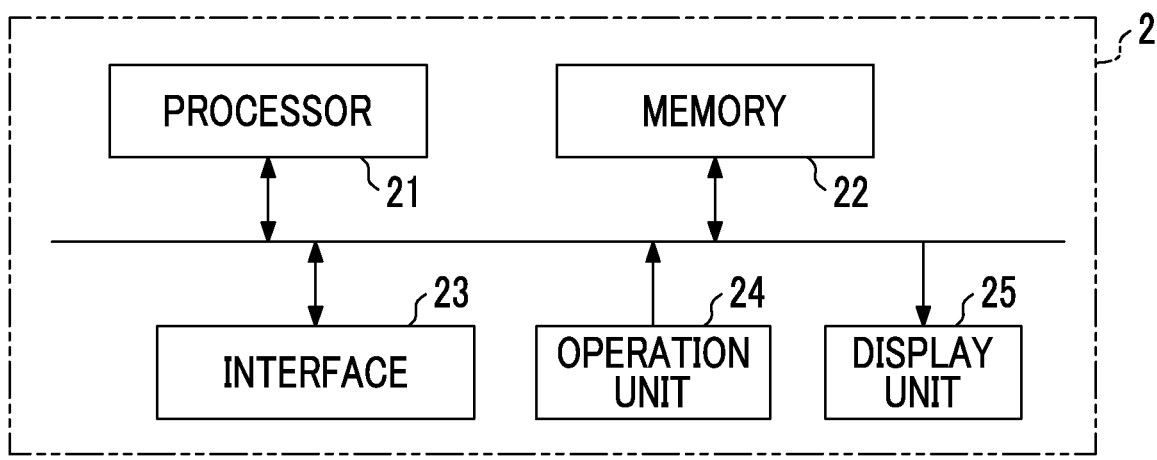
FIG. 2 is a diagram illustrating an example of a configuration of a terminal 2.

FIG. 2 is a diagram illustrating an example of the configuration of the terminal 2. The terminal 2 illustrated in FIG. 2 includes a processor 21, a memory 22, an interface 23, an operation unit 24, and a display unit 25. These components are communicably connected to each other by, for example, a bus.

The processor 21 controls each unit of the terminal 2 by reading and executing a computer program (hereinafter, simply referred to as a program) stored in the memory 22. The processor 21 is, for example, a central processing unit (CPU).

The memory 22 is a storage unit that stores an operating system, various programs, data, and the like, which are read by the processor 21. The memory 22 has a Random Access Memory (RAM) or a Read Only Memory (ROM). The memory 22 may have a solid state drive, a hard disk drive, or the like.

The interface 23 is a communication circuit that communicatively connects the terminal 2 to the document creation apparatus 1 via the communication line 3 in a wired or wireless manner.

The operation unit 24 is equipped with operators such as operation buttons for giving various instructions, a keyboard, a touch panel, and a mouse, receives an operation, and sends a signal corresponding to the operation content to the processor 21.

The display unit 25 includes a display screen such as a liquid crystal display, and displays an image under the control of the processor 21. A transparent touch panel of the operation unit 24 may be disposed so as to be superimposed on the display screen.

Configuration of Document Creation Apparatus

Figure 3:
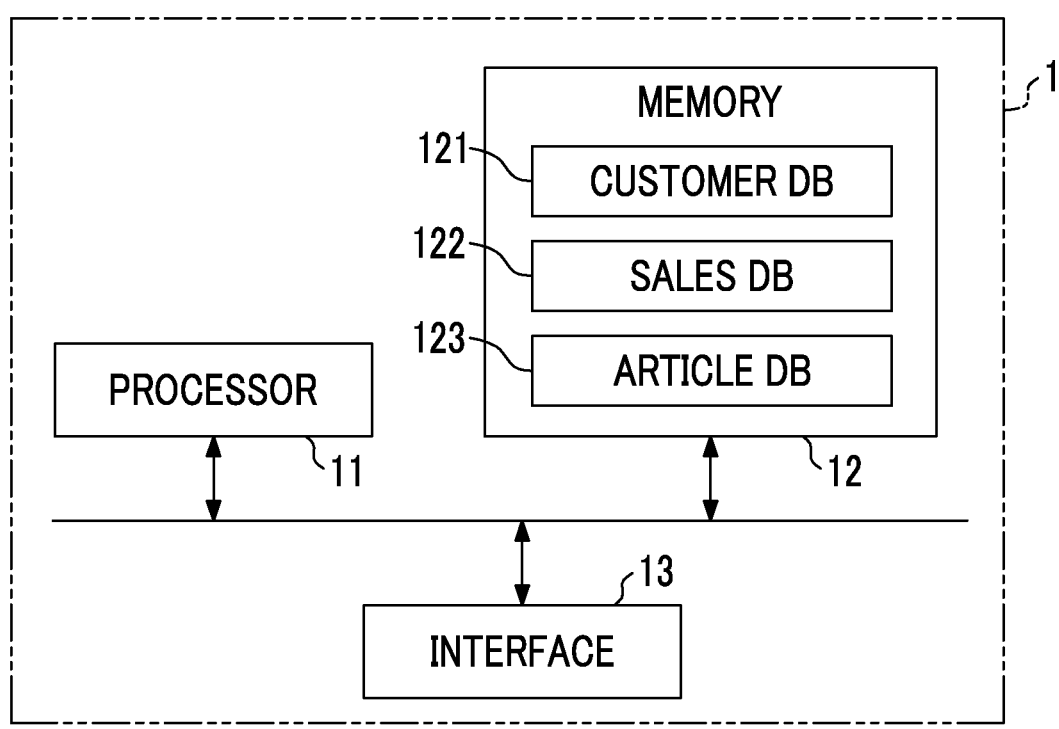
FIG. 3 is a diagram illustrating an example of a configuration of a document creation apparatus 1.

FIG. 3 is a diagram illustrating an example of the configuration of the document creation apparatus 1. The document creation apparatus 1 illustrated in FIG. 3 includes a processor 11, a memory 12, and an interface 13. These components are communicably connected to each other by, for example, a bus.

The processor 11 controls each unit of the document creation apparatus 1 by reading and executing a program stored in the memory 12. The processor 11 is, for example, a CPU.

The interface 13 is a communication circuit that communicatively connects the document creation apparatus 1 to the terminal 2 via the communication line 3 in a wired or wireless manner.

The memory 12 is a storage unit that stores an operating system, various programs, data, and the like read by the processor 11. The memory 12 has RAM and ROM. Note that the memory 12 may include a solid state drive, a hard disk drive, or the like.

The memory 12 also stores a customer DB 121, a sales DB 122, and an article DB 123.

Configuration of Customer DB

Figure 4:
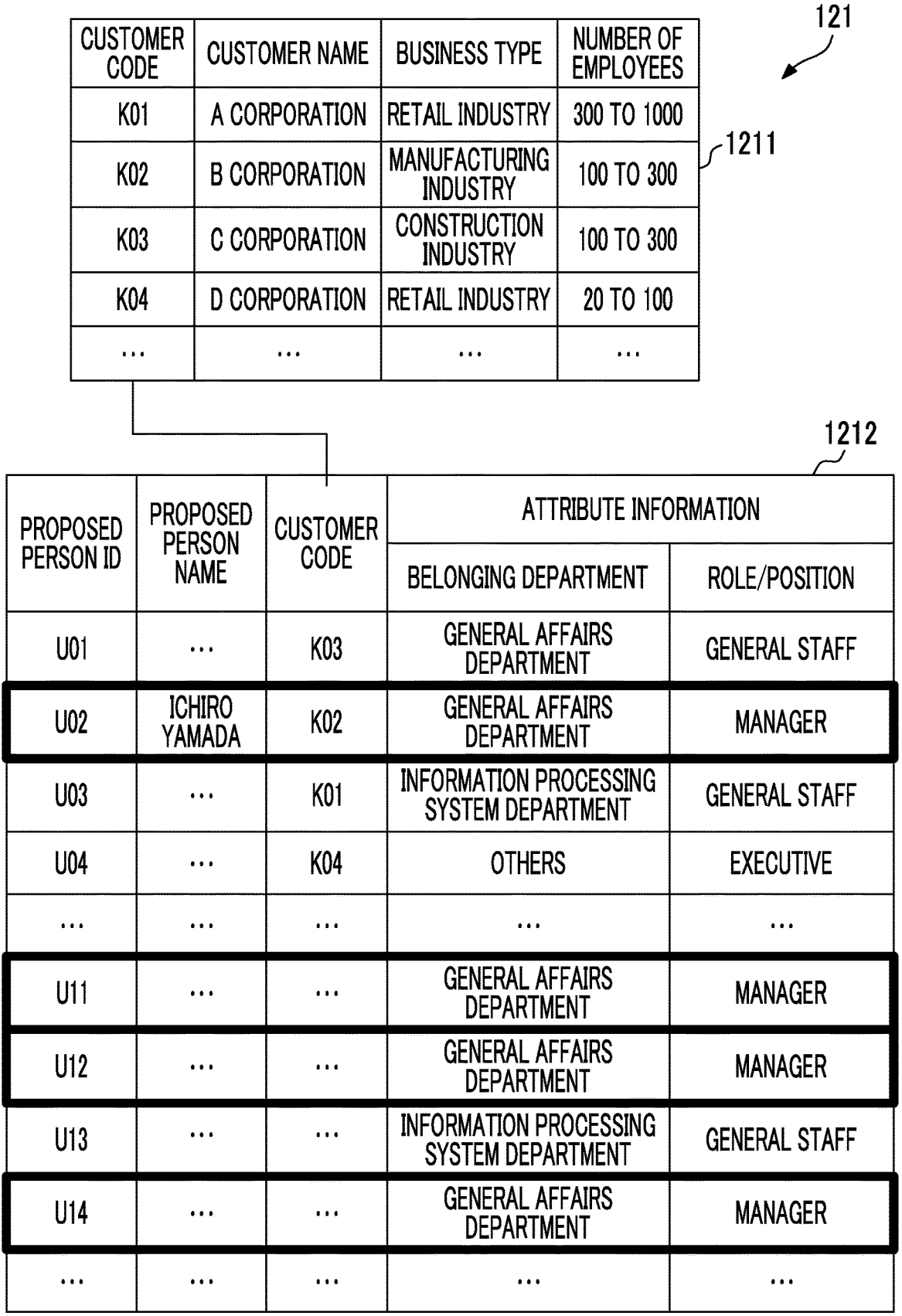
FIG. 4 is a diagram illustrating an example of a customer DB 121.

FIG. 4 is a diagram illustrating an example of the customer DB 121. The customer DB 121 is a database for storing organization information on a customer which is a sales destination, and information on a person who belongs to the customer, actually reads the proposal, and determines whether or not a contract is necessary (hereinafter, also referred to as "proposed person"). The customer DB 121 illustrated in FIG. 4 has an organization information table 1211 and a proposed person information table 1212.

The organization information table 1211 is a table for storing organization information on a customer which is a sales destination. For example, the organization information table 1211 illustrated in FIG. 4 has items of customer code, customer name, business type, and number of employees. The customer code is an item which is a main key in the organization information table 1211, and a different symbol is assigned to each record and is used to uniquely identify each record.

The customer name is an item indicating a character string indicating the name of the customer. The business type is an item indicating the type of business of the customer. The number of employees is an item illustrating the number of employees working for the customer, and is mainly used as an index of the business scale of the customer. In the organization information table 1211 illustrated in FIG. 4, for example, the customer code "K02" is associated with the customer name "B Corporation", the business type of this company is "manufacturing industry", and the number of employees is "100 or more and less than 300".

The proposed person information table 1212 is a table for storing the information on the proposed person. For example, the proposed person information table 1212 illustrated in FIG. 4 has items of a proposed person ID, a proposed person name, a customer code, and attribute information. The proposed person ID is an item which is a main key in the proposed person information table 1212, and a different symbol is assigned to each record and is used to uniquely identify each record.

The proposed person name is an item indicating a character string indicating the name of the proposed person. The customer code is identification information of a customer (company) at which the proposed person works. This customer code is the customer code of the organization information table 1211, and associates the proposed person with the customer name, the business type, and the number of employees. For example, in the proposed person information table 1212 illustrated in FIG. 4, the proposed person name "Ichiro Yamada" is identified by the proposed person ID "U02" and works for the customer (company) indicated by the customer code "K02". That is, the proposed person name "Ichiro Yamada" is an employee of "B Corporation" having 100 or more and less than 300 employees in the manufacturing industry.

In the proposed person information table 1212 illustrated in FIG. 4, the attribute information is information indicating the attributes of the proposed person. This attribute information has items of "belonging department" indicating the department to which the proposed person belongs and "role/position" indicating the role or position of the proposed person. For example, in the proposed person information table 1212 illustrated in FIG. 4, the proposed person name "Ichiro Yamada" belongs to the "general affairs department" of "B Corporation" and has a role of "manager".

Configuration of Sales DB

FIG. 5 is a diagram illustrating an example of the sales DB 122. The sales DB 122 is a database that stores sales activities for selling products. The sales DB 122 illustrated in FIG. 5 stores information on contracts that have been established for each product handled.

The sales DB 122 illustrated in FIG. 5 has a product table 1221 and a sales history table 1222. The product table 1221 is a table that stores products that the company handles. The product table 1221 has items of a product ID and a product type. The product ID is identification information of a product to be handled. The product type is a character string indicating the description of the product. For example, according to the product table 1221 illustrated in FIG. 5, the product ID "P81" is identification information of the product type "multifunction peripheral".

The sales history table 1222 is a table that stores a history of sales activities. The sales history table 1222 illustrated in FIG. 5 associates, for each contract that has been established, a proposed person ID indicating the proposed person involved in the contract and interest information indicating the interest of the proposed person. The interest information is information indicating whether the proposed person has interest in each of a plurality of topics. For example, in the sales history table 1222 illustrated in FIG. 5, the topics included in the interest information are "work efficiency improvement", "cost reduction", "security", "information management", and "enhancement". Then, for example, the contract identified by the contract ID "C01" is established by the proposed person identified by the proposed person ID "U11" receiving a proposal from the sales representative, and the topic of the interest to the proposed person is "cost reduction".

Note that this interest information may be generated in any way. For example, the interest information illustrated in FIG. 5 is generated for each contract by a sales representative who is involved in the contract determining and inputting the topic that leads to the contract through an interview with the proposed person.

Configuration of Article DB

FIG. 6 is a diagram illustrating an example of the article DB 123. The article DB 123 is a database that stores articles incorporated in documents such as proposals created by the document creation apparatus 1. The document creation apparatus 1 creates a document by selecting some from a plurality of articles stored in the article DB 123 and combining the selected articles. The article DB 123 illustrated in FIG. 6 has items of article ID, article type, article classification, product ID, topic type, and article data.

The article ID is an item indicating identification information for identifying each of the articles stored in the article DB 123. The article type is an item indicating the type of the article such as a cover page, a table of contents, and a summary. For example, the proposal is configured by arranging these types of articles in the order of cover page→table of contents→industry trend→customer problem→product information→case information→summary. The memory 12 stores one or more templates of this proposal. The processor 11 selects and acquires necessary types of articles from the article DB 123 according to the template of the proposal, and combines and arranges the articles to create individual proposals. The processor 11 is an example of a processor that acquires one or more articles for each type of article.

The article classification is an item indicating whether the article is common to a plurality of products, or unique to a product. The product ID is an item indicating identification information of a product referred to in the article when the article classification is unique to the product. The topic type is an item indicating a topic to be covered in the article.

For example, in the article DB 123 illustrated in FIG. 6, the article IDs "D31", "D32", and "D33" are all articles related to the customer's problem addressed by the product, that is, "customer problem", and the contents thereof is "product unique" and is related to the product indicated by the product ID "P81". On the other hand, these three articles have different topic types.

That is, the article indicated by the article ID "D31" describes the customer problem to be addressed for this product from the viewpoint of "work efficiency improvement", while the article indicated by the article ID "D32" describes the customer problem from the viewpoint of "cost reduction". Further, the article indicated by the article ID "D33" describes this customer problem from the viewpoint of "security".

Functional Configuration of Document Creation Apparatus

Figure 7:
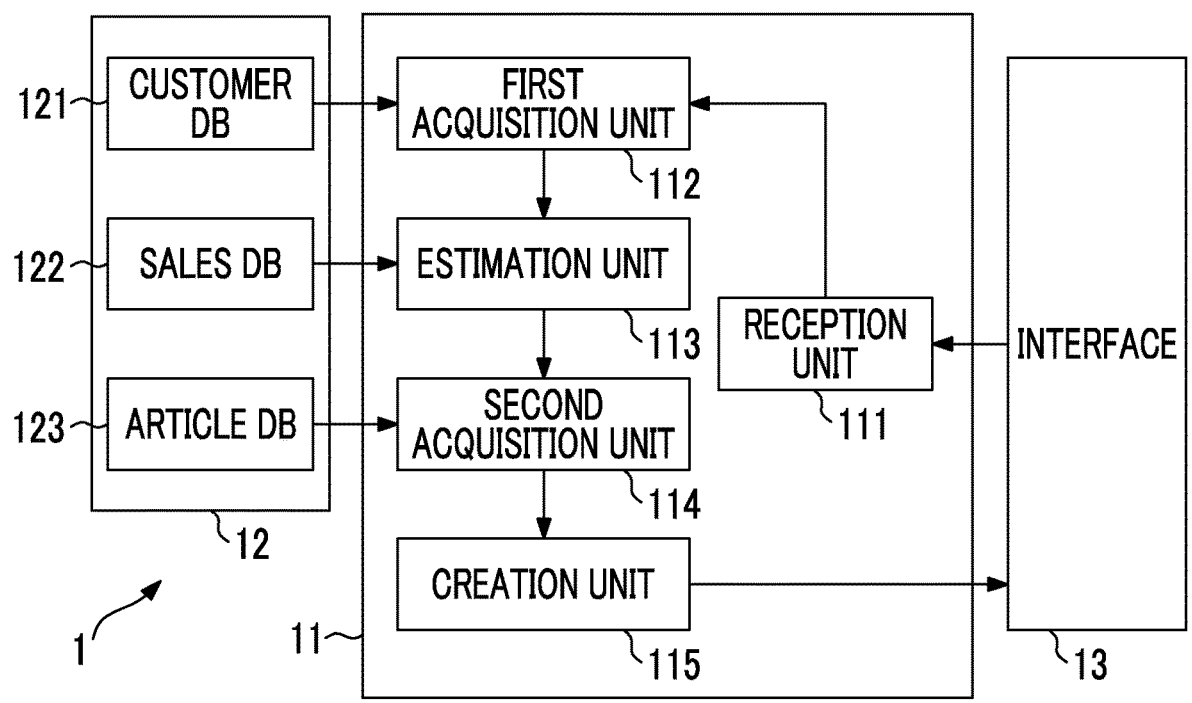
FIG. 7 is a diagram illustrating an example of a functional configuration of the document creation apparatus 1.

FIG. 7 is a diagram illustrating an example of the functional configuration of the document creation apparatus 1. The processor 11 of the document creation apparatus 1 functions as a reception unit 111, a first acquisition unit 112, an estimation unit 113, a second acquisition unit 114, and a creation unit 115 by executing the program stored in the memory 12.

The reception unit 111 receives the designation of the proposed person who submits the proposal from the terminal 2 via the communication line 3 and the interface 13.

The first acquisition unit 112 acquires, from the customer DB 121, information on the proposed person (that is, the target person) indicated by the designation received by the reception unit 111. That is, the processor 11 that functions as the first acquisition unit 112 is an example of a processor that acquires information about a person.

For example, the proposed person information table 1212 of the customer DB 121 illustrated in FIG. 4 stores attribute information for each proposed person. Therefore, the processor 11 may acquire this attribute information as the information on the proposed person. In this case, the processor 11 is an example of a processor that acquires information indicating the attributes of a person.

The estimation unit 113 estimates a topic of interest to the proposed person, based on the information on the proposed person acquired by the first acquisition unit 112 and the information stored in the sales DB 122. For example, the estimation unit 113 specifies the attribute of the designated proposed person, from the information acquired by the first acquisition unit 112, and extracts the proposed persons having the same attribute as the specified attribute, among the proposed persons of the established contract, stored in the sales DB 122. Note that the attributes of the proposed person may be only personal attributes of the proposed person, but may include information on the organization to which the proposed person belongs.

Then, the estimation unit 113 estimates the topics of interest to the designated proposed person by totaling the topics of interest to the extracted proposed person. Thus, for example, a topic in which "managers" who work in the "general affairs department" are commonly interested is estimated. That is, the processor 11 that functions as the estimation unit 113 is an example of a processor that estimates a topic of interest to a person, based on the acquired information.

Further, the proposed person ID in the customer DB 121 illustrated in FIG. 4 is the same as the proposed person ID in the sales DB 122 illustrated in FIG. 5. Therefore, this processor 11, which acquires data from the customer DB 121 illustrated in FIG. 4 and the sales DB 122 illustrated in FIG. 5, is an example of a processor which acquires data in which attribute of each of a plurality of persons is associated with a topic of interest to each of the plurality of persons.

Further, the processor 11 is an example of a processor that estimates a topic of interest to one designated person, based on the acquired information indicating the attribute of one designated person and the acquired data in which the attribute of each of the plurality of persons is associated with a topic of interest to each of the persons.

As described above, in a case where the processor 11 specifies the information on the organization to which the proposed person belongs by including the attributes of the proposed person, for example, the processor 11 may extract proposed persons belonging to a company which is a "manufacturing industry" and has the number of employees of "100 or more and less than 300", from among the proposed persons of the contract that has been established.

The second acquisition unit 114 acquires, from the article DB 123, one or more articles related to the topic estimated by the estimation unit 113. That is, the processor 11 that functions as the second acquisition unit 114 is an example of a processor that acquires one or more articles related to the estimated topic.

The creation unit 115 creates a proposal by combining the acquired articles and sends the proposal to the terminal 2 via the interface 13. That is, the processor 11 that functions as the creation unit 115 is an example of a processor that creates a document using one or more acquired articles.

Operation of Document Creation Apparatus

Figure 8:
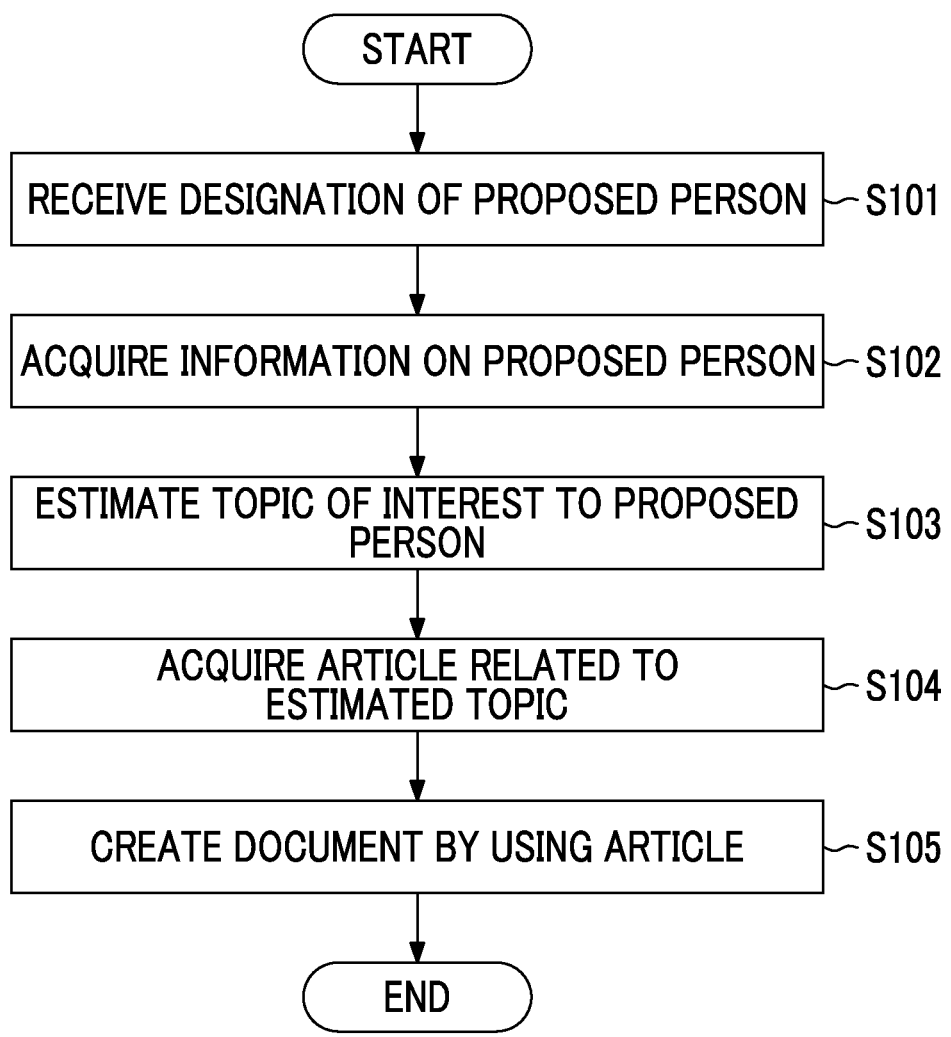
FIG. 8 is a flowchart illustrating an example of an operation flow of the document creation apparatus creating a document.

FIG. 8 is a flowchart illustrating an example of the operation flow of the document creation apparatus 1 creating a document. The processor 11 of the document creation apparatus 1 receives the designation of the proposed person from the terminal 2 (step S101).

Figure 9:
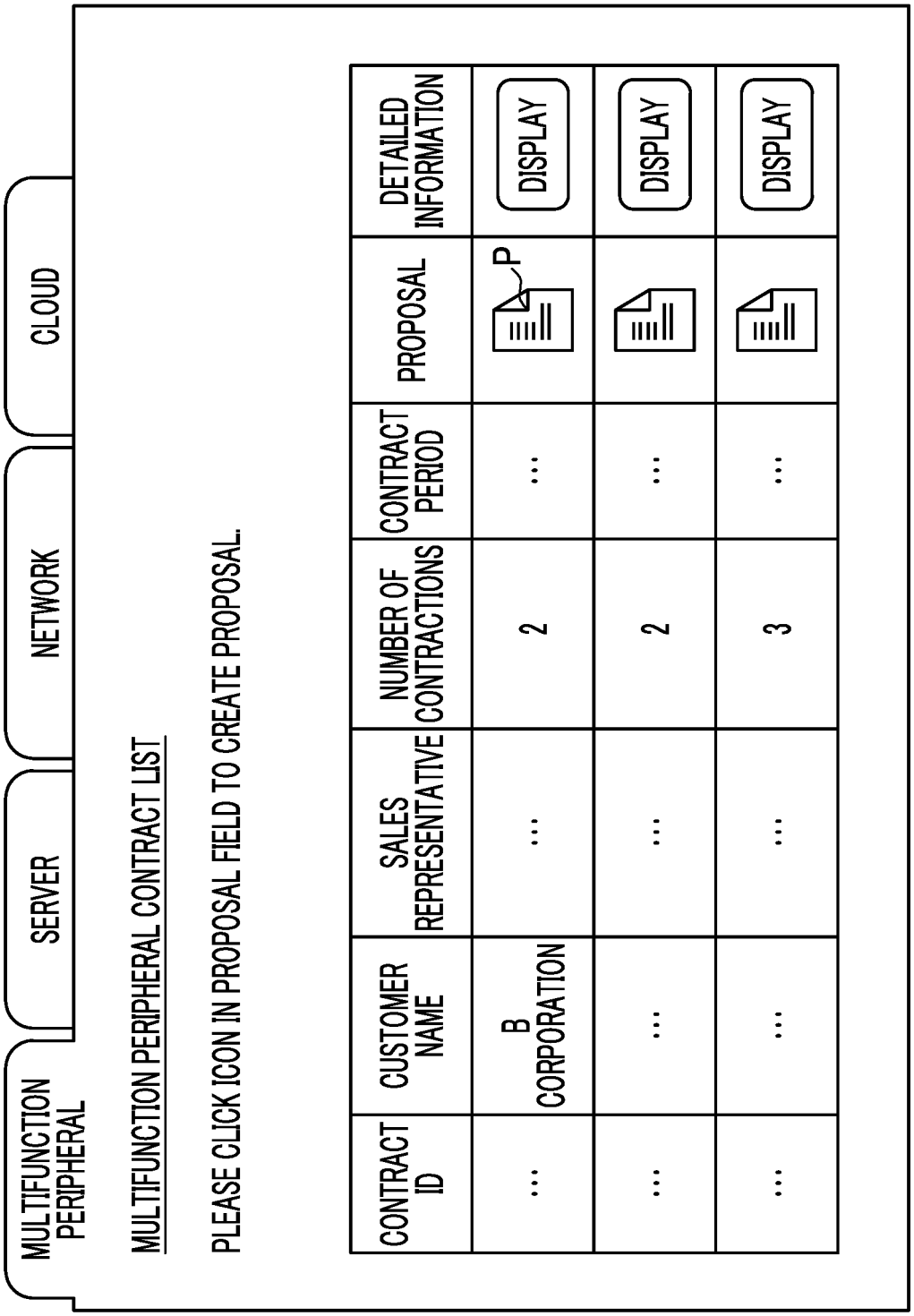
FIG. 9 is a diagram illustrating an example of an operation screen displayed on the terminal 2.

FIG. 9 is a diagram illustrating an example of an operation screen displayed on the terminal 2. On the operation screen illustrated in FIG. 9, tabs are displayed at the upper part, and the contents of the tabs are displayed by clicking any one of the tabs with a mouse or the like. On the operation screen illustrated in FIG. 9, the tab of "multifunction peripheral" is clicked, and the contract list, which is a list of contracts of multifunction peripheral, is displayed. When the user wants to add a new contract to any of the contracts, the user clicks the icon of the proposal in the contract list.

For example, looking at the operation screen illustrated in FIG. 9, in a case where the user who is a sales person thinks that the number of contractions of B Corporation is less than the original number, he/she clicks the icon P and gives instructions to create a proposal for B Corporation.

FIG. 10 is a diagram illustrating an example of an operation screen for inputting information on a proposed person. In a case where the user clicks the icon P of the proposal on the operation screen illustrated in FIG. 9, the terminal 2 displays an operation screen requesting the user for the information on the proposed person of the customer corresponding to the icon P.

On the operation screen illustrated in FIG. 10, the user inputs information in the text input fields F1 to F4. The input fields F1 to F4 respectively correspond to "proposal destination customer name" which is the name of the customer to which the proposed person belongs, "proposed person name" which is the name of the proposed person, "belonging department name" which is the name of the department to which the proposed person belongs, and the "position/role" of the proposed person. In the input field F1, the customer name corresponding to the clicked icon P is pre-filled by the processor 21 of the terminal 2.

Note that on the operation screen illustrated in FIG. 10, the button B1 is a button for "return", and in a case where this button is pressed by the user, the terminal 2 discards the contents input in the input fields F1 to F4, and returns the display to the operation screen shown in FIG. 9. Further, the button B2 is a button for advancing to "next", and in a case where this button is pressed by the user, the terminal 2 sends the contents input in the input fields F1 to F4 to the document creation apparatus 1. Thus, the document creation apparatus 1 receives the designation of the proposed person from the terminal 2.

The processor 11 refers to the customer DB 121 of the memory 12 to acquire the information on the proposed person indicated by the received designation (step S102), and refers to the sales DB 122 of the memory 12 to estimate the topic of interest to the proposed person (step S103).

For example, when the processor 11 receives from the terminal 2 the designation of the proposal destination customer name "B Corporation", the proposed person name "Ichiro Yamada", the belonging department name "general affairs department", and the role/position "manager (general manager)", the processor 11 specifies the attribute of the proposed person from the customer DB 121. That is, the processor 11 specifies that the attribute of "Ichiro Yamada" is "manager" of "general affairs department".

Next, the processor 11 specifies, in the customer DB 121, other proposed persons who are in common with "Ichiro Yamada" in the point of "manager" of the "general affairs department". Here, the processor 11 specifies the proposed IDs "U11", "U12", and "U14" as identification information on the proposed persons who are the "manager" of the "general affairs department".

Then, the processor 11 refers to the sales DB 122, and totals the topics of interest to the proposed persons identified by the proposed IDs "U11", "U12", and "U14", in the contract that has already been established. According to the sales DB 122 illustrated in FIG. 5, it can be seen that these three proposed persons are all interested in "cost reduction". Therefore, the processor 11 estimates that "Ichiro Yamada" who has the same attributes as these three people may also be interested in "cost reduction".

Next, the processor 11 acquires an article related to the estimated topic, from the article DB 123 (step S104). For example, in the above-described example, the processor 11 estimates "cost reduction" as a topic of interest to the proposed person "Ichiro Yamada", and thus the processor 11 acquires the article IDs "D32" and "D52" from the article DB 123 illustrated in FIG. 6. It should be noted that the processor 11 acquires other articles that are not described for each topic type, for the reason that the product ID of the product to be sold is common, the product has been used before, and the like.

Then, the processor 11 creates a document by using the acquired article (step S105). The processor 11 creates a proposal by connecting the above-described articles, according to the template of the proposal stored in the memory 12, for example.

By performing the operations described above, the document creation system 9 creates a document such as a proposal by selecting and combining articles that are related to a topic that is estimated to be of interest to the target person. Therefore, the document creation system 9 is more likely to create a proposal that attracts the interest of the proposed person than a system that does not consider the interest of the proposed person.

Modification Example

The above is the description of the exemplary embodiment, but the contents of this exemplary embodiment can be modified as follows. Further, the following modification examples may be combined.

<1>

In the above-described exemplary embodiment, the document creation system 9 is a so-called client/server system in which the document creation apparatus 1 and the terminal 2 are connected to each other, and creates a document such as a proposal written according to the interest of the proposed person designated by the terminal 2, but one apparatus may perform the creation. In this case, for example, the document creation apparatus 1 may have a configuration corresponding to the operation unit 24 and the display unit 25 included in the terminal 2. The user may directly operate the document creation apparatus 1 to create a document.

<2>

In the above-described exemplary embodiment, the sales DB 122 stores the interest information indicating the presence or absence of the interest of the proposed person, but may store the degree of interest of the proposed person. FIG. 11 is a diagram illustrating an example of the sales DB 122a in the modification example. The sales DB 122a illustrated in FIG. 11 has a product table 1221 and a sales history table 1222a. The sales history table 1222a stores interest information indicating the degree of interest of the proposed person. Further, this sales history table 1222a stores visit dates and times instead of contract IDs. That is, the sales history table 1222a is a table that does not store information on contracts that have been established, but stores, for each product listed in the product table 1221, information on sales activities visiting the sales destination for that product.

For example, the sales representative gives a questionnaire about the interest in the above-described five topics, to the proposed person at the time of visiting. This questionnaire has a score type in which the most interesting topic has "5 points", and the topic of least interest has "1 point", and the degree of interest is answered. The sales representative collects and totals the questionnaires and inputs the result of the totalization into the document creation apparatus 1, whereby the sales history table 1222a illustrated in FIG. 11 is generated and stored.

Then, in a case where the processor 11 specifies the proposed IDs "U11", "U12", and "U14", as described above, as the identification information of the other proposed persons having the same attributes as the attributes of the proposed person indicated by the designation received from the terminal 2, the processor 11 refers to the sales DB 122a illustrated in FIG. 11, totals the points indicating the degree of interest of the proposed persons identified by these proposed person IDs, respectively, and specifies the topic with a total score equal to or greater than the threshold.

For example, in the example illustrated in FIG. 11, "work efficiency improvement" is 4+4+3=11 points, and "cost reduction" is 5+5+5=15 points. Therefore, for example, in a case where the threshold is set to 10 points, the processor 11 specifies two items "work efficiency improvement" and "cost reduction" as topics of interest of the proposed person. In this case, "security" with a total score of 3+3+2=8 points, "information management" with 2+1+1=4 points, and "enhancement" with 1+2+4=7 points are excluded from specific targets. The document creation apparatus 1 creates a proposal by focusing on these two specified topics. As a result, a document in which the degree of interest of the proposed person is reflected in the display mode is created.

Further, the document creation apparatus 1 may change the display mode of articles according to the totalized points. For example, as described above, in a case where "work efficiency improvement" is 11 points and "cost reduction" is 15 points, the ratio of these articles occupied in the proposal may be 11:15. In addition to the ratio of articles, the display mode of the article may be the display mode of the article such as font size or font type, and the layout, order, or the like of the article, or a combination thereof. In this case, the processor 11 is an example of a processor that determines at least one of display modes, arrangements, orders, or ratios of the one or more articles, according to the degree of interest of the person in the estimated topic, and creates the document.

<3>

In the above-described modification example, the document creation apparatus 1 changes the display modes of articles according to the estimated degree of interest, but the display modes of articles may be determined for each type of article in addition to the degree of interest. That is, the display mode of the article may be determined according to the combination of the degree of interest and the type of article.

Figure 12:
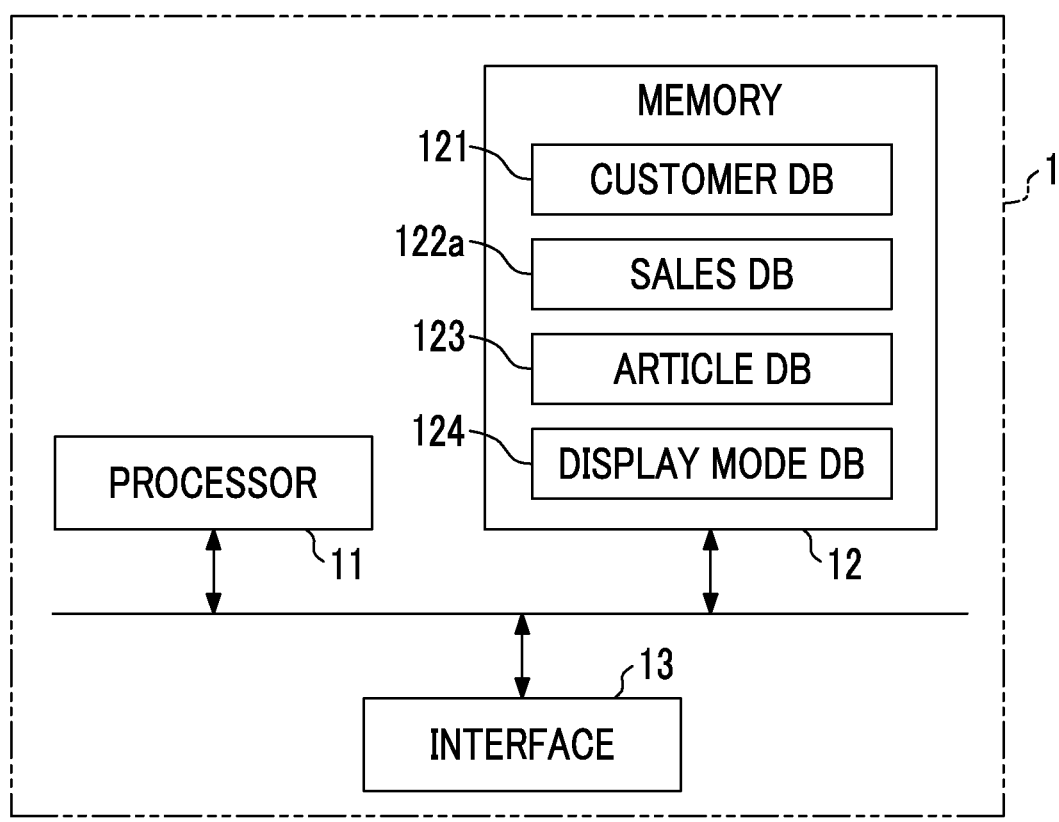
FIG. 12 is a diagram illustrating an example of a configuration of a document creation apparatus 1 in the modification example.

FIG. 12 is a diagram illustrating an example of the configuration of the document creation apparatus 1 in the modification example. The document creation apparatus 1 illustrated in FIG. 12 stores the above-described sales DB 122a in the memory 12, and further stores the display mode DB 124.

FIGS. 13A and 13B are diagrams illustrating an example of the display mode DB 124. The display mode DB 124 stores, for each article type, parameters and rules for reflecting the degree of interest, in the display mode of the article. For example, the display mode DB 124 illustrated in FIG. 13A stores parameters for determining three types of display modes, that is, the area ratio, the layout, and the character modification, for the top three topics with high degree of interest. According to the display mode DB 124 illustrated in FIG. 13A, for example, a topic of a first degree of interest is displayed with an area ratio of 60% in the article type "customer problem", and a second topic is displayed with an area ratio of 40%. In this case, the topic of a third degree of interest is not displayed in the article type "customer problem". On the other hand, in the article type "case information", areas of 50%, 30%, and 20% are given to topics of first, second, and third degrees of interest, respectively.

Further, the display mode DB 124 illustrated in FIG. 13B stores the area ratio rule for each article type. For example, in this case, the articles of the article type "customer problem" are displayed in the area ratio proportional to the points of interest, whereas the articles of the article type "case information" are displayed in the area ratio proportional to the square of the points of interest.

Figures 14, 15:
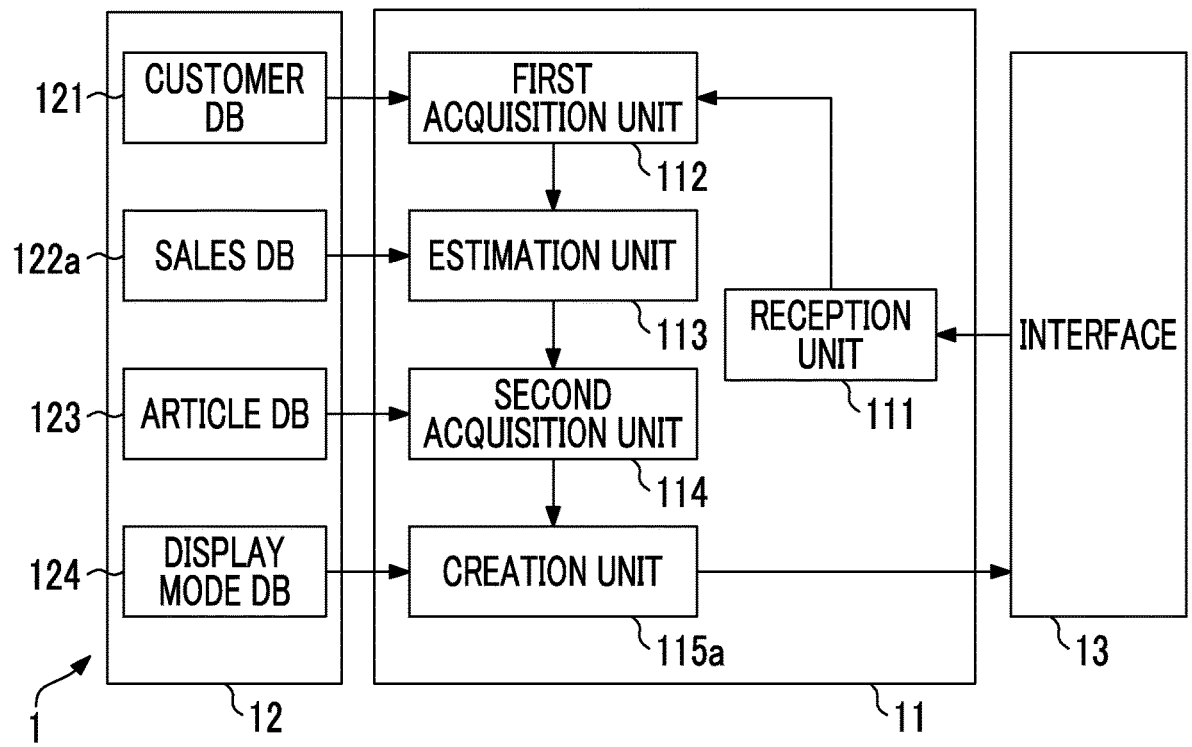
FIG. 14 is a diagram illustrating a functional configuration of the document creation apparatus 1 in the modification example.
FIG. 15 is a diagram illustrating an example of a sales history table 1222b in the modification example.

FIG. 14 is a diagram illustrating a functional configuration of the document creation apparatus 1 in the modification example. The processor 11 of the document creation apparatus 1 illustrated in FIG. 14 functions as a creation unit 115a instead of the creation unit 115 illustrated in FIG. 17. In a case of combining the acquired articles, the creation unit 115a refers to the display mode DB 124 and determines the display mode of each article according to the combination of the degree of interest in the articles and the article types.

That is, in this modification example, the degree of interest is not uniformly reflected in the article display mode, but the degree is reflected in the article display mode for each combination of the degree of interest and the article type. That is, the processor 11 is an example of a processor that acquires one or more articles for each type of article, determines at least one of display modes, arrangements, orders, or ratios of the one or more articles, according to the combination of the degree and the type, and creates the document.

<4>

In the above-described exemplary embodiment, the interest information included in the sales DB 122 is generated for each contract by a sales representative who is involved in the contract determining and inputting the topic that leads to the contract through an interview with the proposed person. Further, in the above-described modification example, the interest information is generated by the sales representative collecting the questionnaires from the proposed person, totaling the questionnaires, and inputting the result of the totalization. However, the mode in which the interest information is generated is not limited to this. For example, the sales DB 122 may include a history in which the reaction of the proposed person to past documents is stored. Then, the processor 11 may acquire this history from the sales DB 122 and generate the above-described interest information based on the history. Examples of "the reaction of the proposed person to the past document" include the number of questions asked for each topic, the number of interruptions, and the explanation time, when visiting the proposed person. The processor 11 is an example of a processor that acquires information including a history in which the reaction of a person to a past document is stored.

<5>

In the above-described modification example, "the reaction of the proposed person to the past document" may be, for example, an audio recorded when the proposal is verbally explained, or a recorded video. FIG. 15 is a diagram illustrating an example of the sales history table 1222*b* in the modification example. In this case, the memory 12 stores the sales history table 1222*b* illustrated in FIG. 15 instead of the sales history table 1222 illustrated in FIG. 5 or the sales history table 1222*a* illustrated in FIG. 11. The sales history table 1222*b* illustrated in FIG. 15 stores the visit date and time, the proposed person ID, and the reaction data in association with each other. The reaction data is recorded data in which the sales representative records the audio uttered by the proposed person indicated by the "proposed person ID" and video data recording the facial expression of the proposed person, in a case where the sales representative visits at the date and time indicated by "visit date and time" to explain the proposal.

The processor 11 acquires video data or audio data from the sales history table 1222*b* illustrated in FIG. 15. That is, the processor 11 is an example of a processor that acquires information including a history in which an audio or video of the person to a past document is stored.

Then, the processor 11 analyzes the acquired video data or audio data and estimates a topic of interest to the proposed person. For example, people tend to focus on a speaker when people are interested in what the speaker explains. Therefore, the processor 11 analyzes, from the video data, the direction of the line of sight of the proposed person during the period in which the sales representative is explaining the proposal, and estimates a topic when a large number of eyes of the proposed persons are focused on a sales representative as a topic of interest to the proposed person.

Further, in a case where the human audio tends to be high-pitched when the topic is interested, the processor 11 may estimate the topic of interest to the proposed person, based on the tone of the audio of the proposed person.

Figure 16:
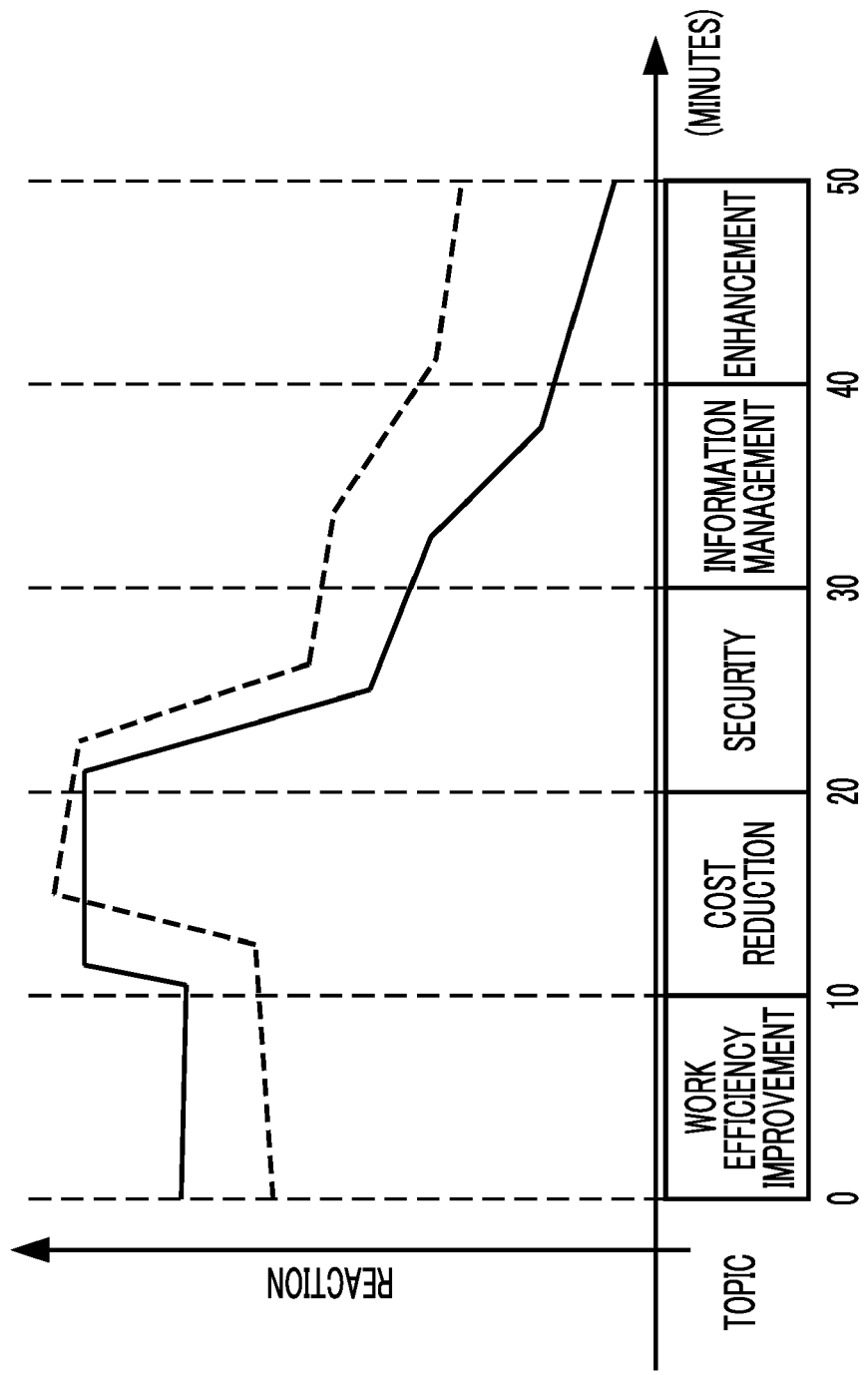
FIG. 16 is a diagram illustrating an example of an analysis result by a processor 11.

FIG. 16 is a diagram illustrating an example of the analysis result by the processor 11. FIG. 16 illustrates the analysis result of the data recorded when the sales representative visits the proposed person and changes the topic every 10 minutes and explains the proposal for 50 minutes. The processor 11 plots the response according to the tone of the audio of the proposed person, and obtains the graph shown by the solid line in FIG. 16. Further, the processor 11 plots the reaction according to the frequency of attention of the proposed person, and obtains the graph shown by the broken line in FIG. 16. From the total score of these reactions, the processor 11 may analyze which time zone the proposed person is interested in, that is, which topic the sales representative is talking about. That is, the processor 11 is an example of a processor that analyzes an audio or video of the person to the past document and estimates a topic of interest to the person.

<6>

The document creation apparatus 1 described above has the processor 11 which is a CPU, but the control unit that controls the document creation apparatus 1 may have another configuration. For example, the document creation apparatus 1 may have various processors in addition to the CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).)

<7>

In the embodiments above, the term "processor 11" is broad enough to encompass one processor 11 or plural processors in collaboration which are located physically apart from each other but may work cooperatively. For example, the processor 21 of the terminal 2 described above may also have at least a part of the function of the processor 11 described above.

The order of operations of the processor is not limited to one described in the embodiments above, and may be changed.

<8>

The program executed by the processor 11 of the document creation apparatus 1 described above is an example of a program causing a computer having a processor to execute a step of acquiring information on a person, a step of estimating a topic of interest to the person, based on the acquired information, a step of acquiring one or more articles relating to the estimated topic, and a step of creating a document by using the acquired one or more articles.

These programs can be provided by being stored in a computer readable recording medium such as a magnetic recording medium such as a magnetic tape and a magnetic disk, an optical recording medium such as an optical disk, a magneto-optical recording medium, and a semiconductor memory. This program may be downloaded via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document creation apparatus comprising:
a processor configured to
acquire an attribute about a person;
specify another person having the attribute;
acquire data that associates the attribute of the other person with topic of interest to the other person;
estimate a topic of interest to the person, based on the data;

acquire one or more articles related to the estimated topic; and create a document by using the acquired one or more articles, wherein for each of the acquired one or more articles, the more a degree of interest of the person in the estimated topic increases, the larger area the acquired article related to the estimated topic occupies in the document.

2. The document creation apparatus according to claim 1, wherein the processor is configured to:

when creating the document by using the acquired one or more articles, determine at least one of display modes, arrangements, orders, or ratios of the one or more articles, according to the degree of interest of the person in the estimated topic.

3. The document creation apparatus according to claim 2, wherein the processor is configured to:

acquire the one or more articles for each article type of a plurality of article types; and when creating the document by using the acquired one or more articles, determine at least one of display modes, arrangements, orders, or ratios of the one or more articles, according to a combination of the degree and the article type.

4. The document creation apparatus according to claim 1, wherein a record of a past reaction of the person to a past document is acquired.

5. The document creation apparatus according to claim 2, wherein a record of a past reaction of the person to a past document is acquired.

6. The document creation apparatus according to claim 3, wherein a record of a past reaction of the person to a past document is acquired.

7. The document creation apparatus according to claim 4, wherein the record of the past reaction is an audio or video of the person to the past documents, and wherein the processor is configured to:

estimate the topic of interest to the person by analyzing the audio or video.

8. The document creation apparatus according to claim 5, wherein the record of the past reaction is an audio or video of the person to the past documents, and wherein the processor is configured to:

estimate the topic of interest to the person by analyzing the audio or video.

9. The document creation apparatus according to claim 6, wherein the record of the past reaction is an audio or video of the person to the past documents, and wherein the processor is configured to:

estimate the topic of interest to the person by analyzing the audio or video.

10. A non-transitory computer readable medium storing a program causing a computer having a processor to execute a process, the process comprising:

acquiring an attribute about a person;

specifying another person having the attribute;

acquiring data that associates the attribute of the other person with topic of interest to the other person;

estimating a topic of interest to the person, based on the data;

acquiring one or more articles related to the estimated topic; and creating a document by using the acquired one or more articles, wherein for each of the acquired one or more articles, the more a degree of interest of the person in the estimated topic increases, the larger area the acquired article related to the estimated topic occupies in the document.

11. A document creation method comprising:

acquiring an attribute about a person;

specifying another person having the attribute;

acquiring data that associates the attribute of the other person with topic of interest to the other person;

estimating a topic of interest to the person, based on the data;

acquiring one or more articles related to the estimated topic; and creating a document by using the acquired one or more articles, wherein for each of the acquired one or more articles, the more a degree of interest of the person in the estimated topic increases, the larger area the acquired article related to the estimated topic occupies in the document.

\* \* \* \* \*